United States Patent [19]

Arai

[11] Patent Number: 4,840,472

[45] Date of Patent: Jun. 20, 1989

[54] REFLECTING/REFRACTIVE OPTICAL SYSTEM

[75] Inventor: Yasunori Arai, Tokyo, Japan

[73] Assignee: Asahi Kogaku Kogyo Kabushiki Kaisha, Tokyo, Japan

[21] Appl. No.: 177,736

[22] Filed: Apr. 5, 1988

[30] Foreign Application Priority Data

Apr. 9, 1987 [JP] Japan .................................. 62-88167

[51] Int. Cl.$^4$ .............................................. G02B 17/08
[52] U.S. Cl. ..................................... 350/442; 350/444
[58] Field of Search ................ 350/442, 443, 444, 445

[56] References Cited

U.S. PATENT DOCUMENTS 2,726,574 12/1955 Mandler .............................. 350/442
2,982,861 5/1961 Menke ............................. 350/442 X
3,160,751 12/1964 Dunning ......................... 350/442 X
4,354,742 10/1982 Abel et al. ............................. 350/442
4,411,499 10/1983 Abel et al. ........................... 350/442

Primary Examiner—John K. Corbin
Assistant Examiner—Scott J. Sugarman
Attorney, Agent, or Firm—Sughrue, Mion, Zinn, Macpeak & Seas

[57] ABSTRACT

A long focal length, super-large aperture ratio reflecting/refractive optical system employing easily workable spherical surfaces and which is suitable for use in an astrocamera or a super-telephoto lens system. The lens system includes four optical units arranged along the optical path, including a first optical unit composed of a meniscus lens having a weak negative power, a second optical unit composed of a reflecting surface having a positive power, a third optical unit for deflecting light reflected from the second optical unit, and a fourth optical unit including at least one negative lens element.

5 Claims, 3 Drawing Sheets

REFLECTING/REFRACTIVE OPTICAL SYSTEM

BACKGROUND OF THE INVENTION

The present invention relates to a reflecting/refractive optical system. More particularly, the present invention relates to a long-focal length, super-large aperture ratio lens system suitable for use either in an astrocamera or as a supe-telephoto lens system.

Besides having a long focus, optical systems suitable for use in astrocameras are required to meet the following conditions:

(1) a super-large aperture ratio of $F_{NO}$ 1:2.8 - 4 that enables a fast photographic speed;

(2) a satisfactorily small chromatic aberration; and (3) spherical abberation, coma and astigmatism that are compensated to the marginal area.

Conventional optics that satisfy these requirements include:

(A) refractive optics that employ super-low dispersion glass;

(B) reflecting optics that employ parabolic reflecting surfaces; and (C) reflecting/refractive optics in which reflecting surfaces are combined with refractive lens systems.

Optics of type (A) are described in Japanese Unexamined Published Patent Application Nos. 220711/1984 and 14613/1987. However, long-focus and large-aperture ratio optics of this type have the following problems:

(i) the optical material used, especially super-low dispersion glass, is very expensive;

(ii) very heavy weight;

(iii) chromatic aberration cannot be satisfactorily compensated if the aperture ratio is on the order of $F_{NO}$ 1:2.8.

An example of the optica of type (B) is a "Newtonian" reflecting system. However, Newtonian reflecting optics having aperture ratios in the range of $F_{NO}$ 1:2.8 - 4 have the following problems:

(i) Coma at off-axis points is too large to ensure the necessary image circle; and (ii) Difficulties involved in producing a parabolic surface results in a low production rate.

An example of the optics of type (C) is a "Schmidt" system, which, however, has the following problems:

(i) It is difficult to work a corrector plate having a biquadratic aspherical surface; and (ii) Because of a curved film surface (imaging surface), the imaging apparatus is inconvenient to operate.

To solve the aforementioned problems, a variety of optical systems have been proposed, but they still have the problem of production problem chiefly because of the use of aspherical surfaces.

Reflecting/refractive optics are also available for use as photographic lens systems, but they are composed of too many elements and their aperture ratio, which is on the order of $F_{NO}$ 1:5.6-11, is insufficient to be used for astrocameras.

SUMMARY OF THE INVENTION

The present invention has been accomplished under the circumstances described above. An object of the invention is to provide a high-performance reflecting/refractiv optical system that employs easily workable spherical surfaces and which attains a long focus and a large aperture ratio of the order of $F_{NO}$ 1:2.8 with a cost-effective optical composition employing a minimum number of lens elements. This system is capable of effectively compensating for chromatic aberration, spherical aberration, coma and astigmatism to the full extent of the field including both the central region and the marginal area.

In accordance with the above and other objects, the invention provides a reflecting/refractive optical system which has four optical units arranged along the optical path and which comprises, in order from the object side, a first optical unit E1 composed of a meniscus lens having a weak negative power, a second optical unit E2 composed of a reflecting surface having a positive power, a third optical unit E3 for deflecting light reflected from the second optical unit, and a fourth optical unit E4 including at least one negative lens element. In addition, this optical system satisfies the following conditions:

(1) $-0.15 < f/f_I < 0$ (2) $0.55 < |R_{I,1}|/f < 0.90$ (3) $0.60 < f/f_{II} < 0.90$ (4) $0.40 < l_{II, III}/f_{II} < 0.8$.

In a preferred embodiment, the fourth optical unit has a two-component-three-element composition comprising, in order form the object side, a positive meniscus lens and a negative lens element cemented to a positive lens element, and which satisfies the following conditions:

(5) $0.15 < R_{IV,1}/f < 0.4$ (6) $\nu_{IV,1} < 30$ (7) $25 < \nu_{IV,3} - \nu_{IV,2}$ (8) $0.08 < R_{IV,4}/f < 0.5$.

In another preferred embodiment, the third optical unit is disposed in such a way that the optical axis of the fourth optical unit intersects the optical axes of the first and second optical units at right angles.

The symbols in conditions (1) to (8) above have the following meanings:

f : focal length of the overall system $f_i$ : composite focal length of the ith optical unit;

$l_{i,j}$ : aerial distance from the ith optical unit to the jth optical unit;

$R_{i,j}$ : radius of curvature of the jth surface in the ith optical unit; and $\nu_{i,j}$ : Abbe number of the jth lens element in the ith optical unit.

Figure 1:
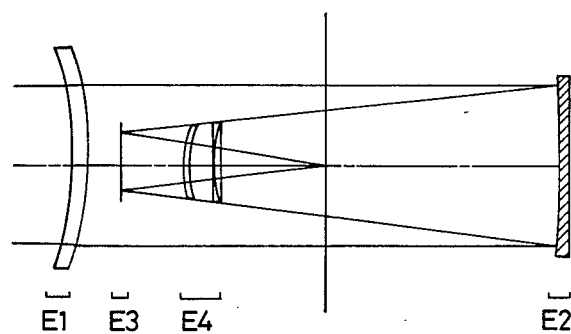
FIGS. 1 and 3 are simplified cross-sectional views of lens systems constructed according to Examples 1 and 2 of the present invention.
Figure 2:
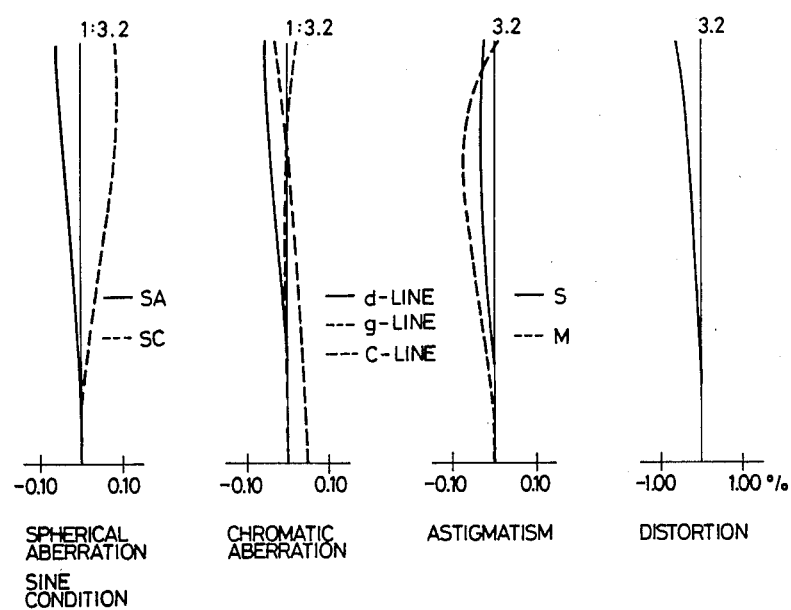
FIGS. 2 and 4 are graphs plotting aberration curves obtained with the lens systems of Examples 1 and 2.
Figure 3:
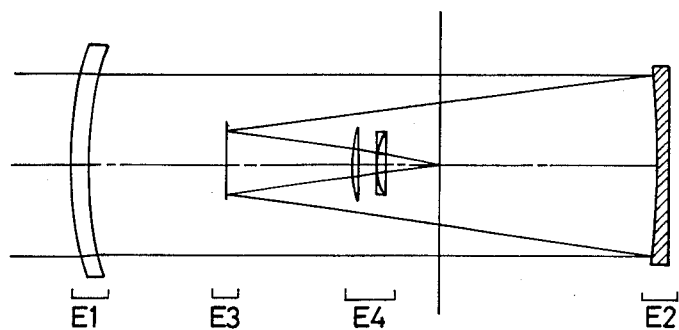
Figure 4:
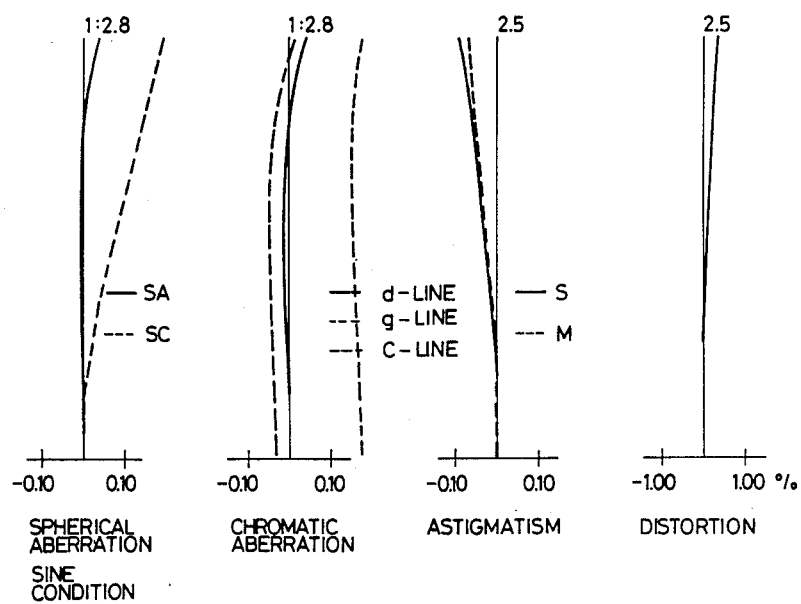
Figure 5:
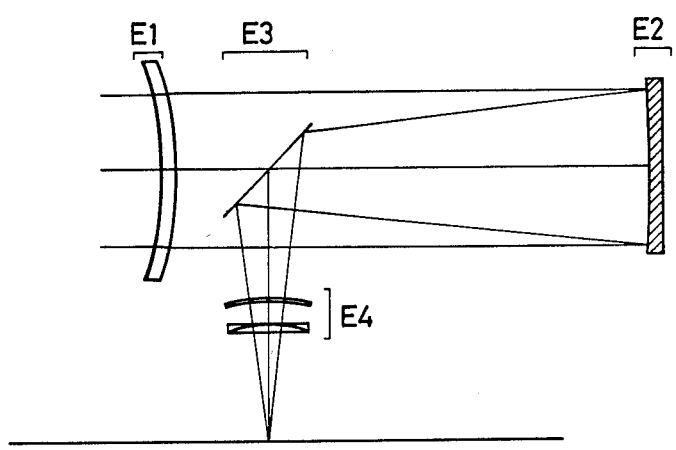
FIG. 5 is a simplified cross-sectional view of a lens system in which the third optical unit is disposed in such a way that the optical axis of the fourth lens unit intersects the optical axis of the first and second lens units.

In these drawings, Ei represents the ith optical unit.

DESCRIPTION OF THE PREFERRED EMBODIMENTS

The criticality of conditions (1) to (8) is described hereinafter.

Condition (1) sets forth the requirement that should be met by the power of the first optical unit in order to compensate for the negative spherical aberration and coma that develop in the second optical unit, which chiefly serves as a condenser. If the upper limit of this condition is exceeded, the desired aberrational compensation is not attained. If the lower limit of condition (1) is not reached, the resulting power is too great to avoid chromatic aberration and large aberrational variations can easily occur.

Condition (2), as well as condition (1), should be satisfied in order to attain a balance between spherical aberration and coma. If this condition is not satisfied, the balance between spherical aberration and coma occurring at the first and second surfaces of the first optical unit will be disturbed. In particular, if the lower limit of condition (2) is not reached, an unduly small radius of curvature will introduce difficulty in the working of the lens surfaces.

Condition (3) sets forth the requirements that should be met by the power of the second optical unit, which is chiefly responsible for image focusing. If the upper limit of this condition is exceeded, the power of the second optical unit becomes excessive and its F number is brought to the brighter side. In this situation, spherical aberration or coma cannot be sufficiently compensated by the first and fourth optical elements so as to ensure good lens performance. If the lower limits of condition (3) is not reached, aberrations can be effectively compensated but, on the other hand, $f_{II}$ increases to produce an excessively elongated optical system.

Condition (4) sets forth the requirement that should be met to ensure that the third optical unit is provided at the proper position. If the upper limit of this condition is exceeded, it is spatially difficult to dispose the fourth optical unit in such a way that it will not block effective rays of light. If the lower limit of condition (4) is not reached, there is no difficulty in properly positioning the fourth optical unit but, at the same time, the third optical unit is positioned so cloase to the second optical unit that effective rays of light from the first optical unit are blocked, causing a significant decrease in the quantity of effective light transmission through the overall optical system.

In accordance with the present invention, spherical aberration and coma can be effectively compensated by satisfying conditions (1) to (4). However, in order to attain a wide image circle, it is desirable to compensate for three other aberrations, that is, astigmatism, field curvature and chromatic aberration. In order to meet this need, the fourth optical unit desirably satisfies conditions (5) to (7).

Condition (5) is necessary to form an aplanatic surface for the spherical-aberration-compensated rays of light from the third optical unit so as to compensate for astigmatism and field curvature without developing spherical aberration or coma. If the upper limit of this condition is exceeded, not only is spherical aberration overcompensated bu astigmatism also occurs. If the lower limit of condition (5) is not reached, not only does excessive distortion occur but also, the balance between spherical aberration and astigmatism is impaired.

Condition (6) sets forth the requirement that should be met to achieve effective compensation for longitudinal chromatic aberration. Because of the weak negative power of the first optical nut, rays of light that are incident on the fourth optical unit are overcompensated with respect to longitudinal chromatic aberration. Condition (6) is necessary to eliminate this problem. If this condition is not satisfied, chromatic aberration in the shorter wavelength range will be excessively overcompensated.

Conditions (7) and (8) set forth the requirements that should be met to achieve effective compensation for lateral chromatic aberration by the cemented lens in the fourth optical unit. First, in order to satisfy condition (7) the negative lens element is made of an optical material having a small Abbe number and the positive lens element is formed of an optical material having a large Abbe number. Secondly, the radius of curvature of the surface at which the two lens elements are cemented together is set so as to satisfy condition (8). If either one of these two conditions is not satisfied, an excessivel large lateral chromatic aberration will occur, causing color diffusion in the marginal portion of the image field.

EXAMPLES

Two specific examples of lens systems of the present invention are described hereinafter with reference to the following table, in which f signifies the focal length of the overall system, $F_{NO}$ is the F number, $2\omega$ is the view angle, $r_i$ is the radius of curvature of the ith surface, $d_i$ is the distance between the ith and (i+1)th surfaces, $N_i$ is the refractive index of the ith lens element at the d-line, and $v_i$ is the Abbe number of the ith lens element.

EXAMPLE 1

| Surface No. | f = 800 mm | $F_{NO}$ 1:3.2 | $2\omega = 6.4°$ | |
|---|---|---|---|---|
| | $r_i$ | $d_i$ | $N_i$ | $v_i$ |
| 1 | −520.00 | 25.0 | 1.51633 | 64.1 |
| 2 | −551.73 | 800.0 | | |
| 3 | −2263.08 | 743.4 | (reflecting surface) | |
| 4 | ∞ | 110.0 | (reflecting surface) | |
| 5 | 229.67 | 10.0 | 1.80518 | 25.4 |
| 6 | 363.36 | 33.66 | | |
| 7 | 1941.13 | 5.0 | 1.80518 | 25.4 |
| 8 | 251.52 | 8.15 | 1.51633 | 64.1 |
| 9 | −891.392 | | | |

(1) $f/f_I = -0.033$
(2) $|R_{I,1}| (= |r_1|)/f = 0.65$
(3) $f/f_{II} = 0.71$
(4) $1_{II, III} (= d_3)/f_{II} = 0.66$
(5) $R_{IV, 1} (= r_5)/f = 0.23$
(6) $v_{IV, 1} (= v_2) = 25.4$
(7) $v_{IV, 3} (= v_4) - v_{IV, 2} (= v_3) = 38.7$
(8) $R_{IV, 4} (= r_8)/f = 0.31$

EXAMPLE 2

| Surface No. | f = 800 mm | $F_{NO}$ 1:2.8 | $2\omega = 6.4°$ | |
|---|---|---|---|---|
| | $r_i$ | $d_i$ | $N_i$ | $v_i$ |
| 1 | 650.00 | 30.0 | 1.51633 | 64.1 |
| 2 | 590.99 | 957.0 | | |
| 3 | −2115.38 | 725.7 | (reflecting surface) | |
| 4 | ∞ | 212.2 | (reflecting surface) | |
| 5 | 222.27 | 9.00 | 1.80518 | 25.4 |
| 6 | 1775.86 | 31.97 | | |
| 7 | 3051.63 | 4.00 | 1.80518 | 25.4 |
| 8 | 107.35 | 12.76 | 1.49782 | 66.8 |
| 9 | −1078.06 | | | |

(1) $f/f_I = -0.053$
(2) $|R_{I,1}| (= |r_1|)/f = 0.81$
(3) $f/f_{II} = 0.76$
(4) $1_{II, III} (= d_3)/f_{II} = 0.69$
(5) $R_{IV, 1} (= r_5)/f = 0.28$
(6) $v_{IV, 1} (= v_2) = 25.4$
(7) $v_{IV, 3} (= v_4) - v_{IV, 2} (= v_3) = 41.4$
(8) $R_{IV, 4} (= r_8)/f = 0.13$

The system of this invention has a super-large aperture ratio of the order of $F_{NO}$ 1:2.8 and employs easily workable spherical surfaces. In addition to these features, the optical system of the present invention provides a long focal length and enables effective compensation for aberrations.

If the fourth optical unit satisfies additional conditions (5) to (7), astigmatism, field curvature and chromatic aberration can be effectively compensated to produce a wider image circle.

Furthermore, if the third optical unit is disposed in such a way that the optical axis of the fourth optical unit intersects the optical axes of the first and second optical units at right angles, a camera can be attached to the outside of the lens barrel of the lens system of the present invention, the system has the advantage that it can be used as a telescope when an eyepiece is attached thereto.

I claim:

1. A reflecting/refractive optical system having four optical units arranged along the optical path, comprising, in order from the object side: a first optical unit comprising a meniscus lens having a weak negative power, a second optical unit comprising a reflecting surface having a positive power, a third optical unit for deflecting light reflected from the second optical unit, and a fourth optical unit comprising at least one negative lens element, said system satisfying the following conditions:

(1) $-0.15 < f/f_I < 0$
(2) $0.55 < |R_{I,1}|/f < 0.90$
(3) $0.60 < f/f_{II} < 0.90$
(4) $0.40 < l_{II,III}/f_{II} < 0.8$ where
f : focal length of the overall system
$f_I$ : focal length of the first optical unit
$R_{I,1}$ : radius of curvature of the first surface of the first optical unit
$l_{II,III}$ : the aerial distance from the second optical unit to the third optical unit.

2. The reflecting/refractive optical system according to claim 1, wherein the fourth optical unit has a two-component-three-element composition comprising, in order from the object side, a positive meniscus lens and a negative lens element cemented to a positive lens element, and which satisfies the following conditions:

(5) $0.15 < R_{IV,1}/f < 0.4$
(6) $\nu_{IV,1} < 30$
(7) $25 < \nu_{IV,3} - \nu_{IV,2}$
(8) $0.08 < R_{IV,4}/f < 0.5$ where
$R_{I,1}$ : radius of curvature of a first surface of the fourth optical unit
$\nu_{IV,1}$ : Abbe number of the positive meniscus lens in the fourth optical unit $\nu_{IV,2}$ : Abbe number of the negative lens element in the fourth optical unit
$\nu_{IV,3}$ : Abbe number of the positive lens element in the fourth optical unit
$R_{IV,4}$ : the radius of curvature of the surface at which the negative lens is cemented to the positive lens in the fourth optical unit.

3. The reflecting/refractive optical system according to claim 1, wherein the third optical unit is disposed in such as way that the optical axis of the fourth optical unit intersects the optical axes of the first and second optical units at right angles.

4. The reflecting/refractive optical system according to claim 1, further satisfying the following chart:

| | f = 800 mm | $F_{NO}$ 1:3.2 | 2ω = 6.4° | |
|---|---|---|---|---|
| Surface No. | $r_i$ | $d_i$ | $N_i$ | $\nu_i$ |
| 1 | −520.00 | 25.0 | 1.51633 | 64.1 |
| 2 | −551.73 | 800.0 | | |
| 3 | −2263.08 | 743.4 | (reflecting surface) | |
| 4 | ∞ | 110.0 | (reflecting surface) | |
| 5 | 229.67 | 10.0 | 1.80518 | 25.4 |
| 6 | 363.36 | 33.66 | | |
| 7 | 1941.13 | 5.0 | 1.80518 | 25.4 |
| 8 | 251.52 | 8.15 | 1.51633 | 64.1 |
| 9 | −891.392 | | | | where f signifies the focal length of the overall system, $F_{NO}$ is the F number, 2ω is the view angle, $r_i$ is the radius of curvature of the ith surface, $d_i$ is the distance between the ith and (i+1)th surfaces, $N_i$ is the refractive index of the ith lens element at the d-line, and $\nu_i$ is the Abbe number of the ith lens element.

5. The reflecting/refractive optical system according to claim 1, further satisfying the following chart:

| | f = 800 mm | $F_{NO}$ 1:2.8 | 2ω = 6.4° | |
|---|---|---|---|---|
| Surface No. | $r_i$ | $d_i$ | $N_i$ | $\nu_i$ |
| 1 | 650.00 | 30.0 | 1.51633 | 64.1 |
| 2 | 590.99 | 957.0 | | |
| 3 | −2115.38 | 725.7 | (reflecting surface) | |
| 4 | ∞ | 212.2 | (reflecting surface) | |
| 5 | 222.27 | 9.00 | 1.80518 | 25.4 |
| 6 | 1775.86 | 31.97 | | |
| 7 | 3051.63 | 4.00 | 1.80518 | 25.4 |
| 8 | 107.35 | 12.76 | 1.49782 | 66.8 |
| 9 | −1078.06 | | | | where f signifies the focal length of the overall system, $F_{NO}$ is the F number, 2ω is the view angle, $r_i$ is the radius of curvature of the ith surface, $d_i$ is the distance between the ith and (i+1)th surfaces, $N_i$ is the refractive index of the ith lens element at the d-line, and $\nu_i$ is the Abbe number of the ith lens element.

* * * * *